United States Patent [19]

Neumann

[11] Patent Number: 4,963,724
[45] Date of Patent: Oct. 16, 1990

[54] APPARATUS FOR PRODUCING AN OPTICAL IMAGE CONTRAST

[75] Inventor: Burkhard Neumann, Wetzlar, Fed. Rep. of Germany

[73] Assignee: Wild Leitz GmbH, Wetzlar, Fed. Rep. of Germany

[21] Appl. No.: 388,375

[22] Filed: Aug. 2, 1989

[30] Foreign Application Priority Data

Aug. 3, 1988 [DE] Fed. Rep. of Germany ....... 3826317

[51] Int. Cl.$^5$ .............................................. G01J 1/20
[52] U.S. Cl. .............................. 250/201.3; 250/201.7; 350/509
[58] Field of Search .......................... 250/201.3, 201.7; 350/509, 510, 527; 354/403

[56] References Cited

U.S. PATENT DOCUMENTS 3,853,398 12/1974 Kano ..................................... 350/527
3,926,500 12/1975 Frosch et al. .......................... 350/17

FOREIGN PATENT DOCUMENTS 0239206 9/1987 European Pat. Off. .
2360197 6/1975 Fed. Rep. of Germany .
3527074 5/1986 Fed. Rep. of Germany .

OTHER PUBLICATIONS

Xiao et al., "A Real-Time Confocal Scanning Optical Microscope", SPIE, vol. 809, Scanning Imaging Technology (1987), pp. 107–113.

Primary Examiner—David C. Nelms
Assistant Examiner—Sherrie Hsia
Attorney, Agent, or Firm—Foley & Lardner, Schwartz, Jeffery, Schwaab, Mack, Blumenthal & Evans

[57] ABSTRACT

An apparatus for producing an optical image contrast which may be used in a microscope is disclosed. Specifically, the apparatus is based on the Moiré effect and uses two screens or gratings which are rotated simultaneously at different angular velocities in order to increase the depth of focus and resolution achievable with conventional systems.

20 Claims, 3 Drawing Sheets

APPARATUS FOR PRODUCING AN OPTICAL IMAGE CONTRAST

BACKGROUND OF THE INVENTION

The present invention relates to an apparatus which may be used in a microscope for producing an optical image contrast. In particular the apparatus includes a first screen, a projection arrangement for producing an image of the first screen in an object plane, a first device for producing a first relative movement between the image of the first screen and the object, a second screen which is geometrically similar to the first screen and a system for imaging the object plane into the plane of said second screen, wherein the imaging scale is chosen so that the image of the first screen in the plane of the second screen is congruent with the second screen.

Classical optical image production has limits with regard to depth of focus and resolution. These limitations have been improved upon by modern arrangements which utilize, among other things, the Moiré effect and scanning methods, which when combined with optical converters and electronics avoid the requirements of direct image observation with the human eye.

DE-Al 35 27 074 discloses a device, preferably intended for use in stereo surgical microscopes, with a projection grating, and a reference grating for producing a Moiré pattern. The relative position of the projection grating and reference grating is preferably changed by periodic tilting of a plane-parallel glass plate located adjacent to the grating which serves as both projection and reference grating. The apparatus is used for determining the nature of the surface of objects by means of contour lines, which are produced by the Moiré effect.

The known arrangement is not suitable for instruments with high microscope resolution and high depth of focus requirements. As already mentioned, the projection grating and reference grating are united in a fixed component and the relative movement is produced by periodic tilting of a downstream optical element. Since the reference grating is not moved in relation to the object, the entire object area cannot be observed at one time. Only the part imaged onto the reference grating apertures can be observed at a given time.

DE-Al 23 60 197 and G. Q. Xiao, G. S. Kino, SPIE Vol. 809, Scanning Imaging Technology 1987, page 107, disclose confocal optical scanning microscopes with simultaneous observation of a plurality of object points. In these cases, a rotating dot screen disk (Nipkow disk) is used. For illumination, the disk is imaged onto the object. For detection, the object is imaged back onto the disk. Again, analogous to the use of a single grating in DE-Al 35 27 074, the projection screen and reference screen are united in a single component.

The confocal arrangement has the effect of improving resolution in the object plane and increasing the depth of focus compared with classical microscopes. The simultaneous observation of many points has the effect of achieving better light efficiency and a faster image composition compared with known single-beam scanning microscopes.

Because the illumination beam and detection beam are combined between the disk and object, separating the detection light from the unwanted light is a great problem and, as a result, there are effective light losses in the detection. An arrangement by Petran et al, cited in Xiao et al, based on the same principle, uses in each case two holes from different areas of the rotating disk for the illumination beam and the detection beam. As a result, the production of a sufficiently exact Nipkow disk and the adjustment of the optics are made considerably more difficult, since the beam from the hole on the illumination side via an object point must always strike precisely at a hole on the detection side, to be precise for all holes of the disk.

Compared with the system by Petran et al., one advantage of the present invention is that it is possible to dispense with the extreme demands on the symmetry of the grating disks — on each grating aperture a second must fit exactly at a certain angular distance — and on the adjustment of the optics. In addition, the requirement according to the present invention, that the image of the first screen in the plane of the second screen be congruent with the second screen, is, on the other hand, much easier to realize and does not have to be maintained very closely.

Compared with the systems according to Xiao et al. and according to DE-Al 23 60 197, one advantage of the present invention is that the light filtered out by the grating on the illumination side quite obviously cannot reach the detection system. Therefore, problems of constant light suppression are considerably reduced by the present invention. In addition, only in the present invention is constant light suppression effectively achieved by the simple method of forming the difference between two images.

SUMMARY OF THE INVENTION

The invention is based on the object of providing an apparatus for producing an optical image contrast which combines the advantages of a Moiré arrangement and of simultaneous scanning methods while being constructed with minimal structural complexity to allow for simple adjustment.

Another object of the invention is to provide an apparatus for producing an optical image contrast which has greater depth of focus and resolution than conventional devices.

Yet another object of the invention is to provide an apparatus for producing an optical image contrast which utilizes separate components as projection and reference grating in order to minimize the demand for symmetry of the grating disks.

A further object of the invention is to provide an apparatus for producing an optical image contrast in a microscope.

Still another object of the invention is to provide an apparatus for producing an optical image contrast which reduces the problems of constant light suppression present in conventional systems.

A further object of the invention is to provide an apparatus for producing an optical image contrast for which the detection device can be either an eyepiece for viewing with a human eye or an optoelectronic image converter system.

Yet another object of the invention is to provide an apparatus for producing an optical image contrast which can use a light source capable of fluorescent excitation in the object.

Yet another object of the invention is to provide an apparatus for producing an optical image contrast which is advantageous for fluorescence microscopy.

A further object of the invention resides in providing an apparatus for producing an optical image contrast which is able to integrate the amplitude of the light intensity over an adjustable region of the image contrast.

Another object of the invention is to provide an apparatus for producing an optical image contrast for which objects may be observed in the bright field and in the dark field.

Yet another object of the invention is to provide an apparatus for producing an optical image contrast which may be used in either a transmitted light system or a reflected light system.

Another object of the invention is to provide an apparatus for optical image contrast which, when coupled with a suitable processing circuit, is capable of automatically focusing without additional optical and electro-optical elements.

In accomplishing the foregoing objects, there has been provided according to the invention an apparatus for producing an optical image contrast, comprising:

a. a first screen;

b. a projection system for producing an image of the first screen in an object plane, the object plane being adapted for placement of an object therein;

c. a first device for producing a first relative movement between the image of the first screen and the object;

d. a second screen e. a system for imaging the object plane into the plane of the second screen, wherein the image of the first screen produced in the plane of the second screen is congruent with the second screen;

f. a second device for producing a second relative movement between the image of the object and the object wherein the image of the object and the image of the first screen in the plane of the second screen have different relative velocities at all times with respect to the second screen; and g. a detection device for detecting light which passes through the second grating, whereby the light has been spatially modulated due to the optical characteristics of the object in the object plane and temporally modulated as a result of the difference in angular velocity between the second screen and the image of the first screen produced at the second screen.

This apparatus according to the invention is simple to integrate into known optical instruments, particularly microscopes.

Any light sources, including white light, can be used. The flicker-photometer method provides an advantageous compromise between the light intensity or image composition time for detection and the object loading time for illumination. Using this method stray light and reflection are suppressed, an optical depth section method is made possible and over-resolution can be achieved. Best resolution and depth of focus is achieved using two-dimensional dot screens as the screens. A good compromise between resolution and light intensity for the apparatus is, however, achieved by the use of square bar gratings. Objects can be observed in the bright field and dark field as well as in reflected light and transmitted light.

Other objects and advantages of the invention will become apparent from the following description of the preferred embodiments of the invention taken in conjunction with the accompanying drawings.

DETAILED DESCRIPTION OF THE PREFERRED EMBODIMENTS

Figure 1:
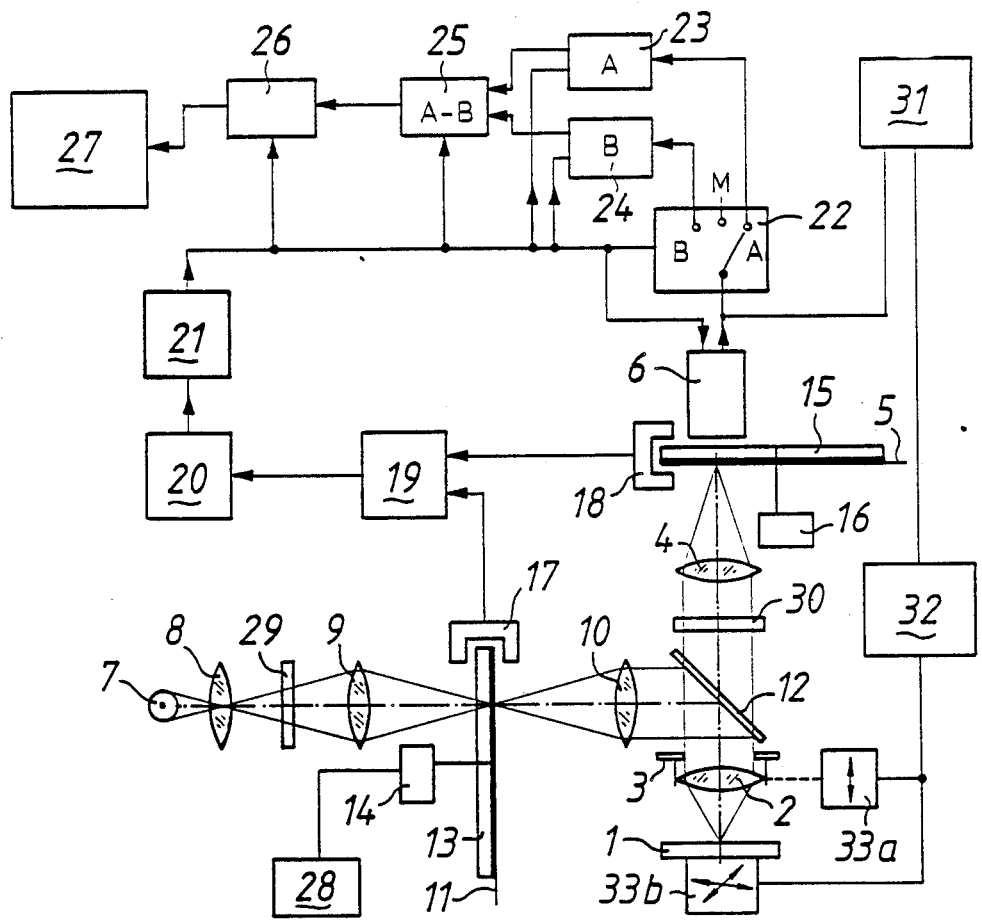
FIG. 1 diagrammatically shows an example of the apparatus according to the invention for producing an optical image contrast, which is integrated in a known reflected light microscope.

FIG. 1 first shows a known microscope arrangement. An object 1 is imaged by an objective 2 with an entrance pupil 3 and a field lens 4 onto an (intermediate) image plane 5 and picked up by a detection system 6. The detection system 6 may consist of an eye piece and a human eye in the case of visual observation. However, the detection system is preferably an optoelectrical image converter, for example a CCD camera.

For reflected-light illumination of the object 1, a system with a light source 7, a collector 8 and lenses 9 and 10 is used. With a beam splitter 12, the illumination beam is coupled with the imaging beam.

According to the invention, a first screen 13 is inserted into this microscope. The screen is made as a radial groove grating on a transparent disk and is placed in the field diaphragm plane 11 of the reflected light illumination system. As a result, a sharp image of the grating 13 is projected onto the plane of the object A motor 14 rotates the grating disk 13. This rotation of the grating produces a movement of the image of the grating 13 in the object plane, which is the first relative movement according to the invention.

A second screen 15 is positioned in the image plane 5. This second grating disk is identical to the first screen 13 and may be produced by a reproduction technique which uses the same pattern as the one used for producing the first screen.

A second motor 16 rotates the second grating disk 15 and thus produces relative movement between the image of the object and the second screen located in the image plane 5, which is the second relative movement according to the invention. For this purpose, the optical apparatus is set up such that the imaging from the field diaphragm plane 11 via the reflection at the object plane onto the image plane 5 takes place on a scale of 1:1. On both gratings 13 and 15 an area is illuminated and respectively picked up by the detection system 6 which provides a full utilization of the field of view of the microscope on the object 1.

If the imaging system reflects the beam in a way which does not change its structure, the illuminated area of the first grating 13 is imaged congruently onto the picked-up surface of the second grating 15, there being a certain relative angular position of the rotating grating disks 13 and 15, in which the image of the first grating 13 comes into coincidence with the second grating 15. The first grating disk 13 is rotated by the motor 14 at an angular velocity $w_1 3$, while the motor 16 rotates the second grating disk 15 at a different angular velocity $w_15$.

From the radial distance r of the associated grating point from the axis of rotation and from the spatial frequency D which can be expressed in terms of the grating constant of the first grating 13, the cyclic frequency $w_1$, at which the illumination of a point of the object 1 is temporally modulated, can be expressed as $w_1 = w_13 \times r \times \Omega$.

The movement of the second grating 15 causes the image of the object 1 to be scanned in the image plane 5 and the image of a point of the object 1 appears in the detection system 6 temporally modulated at the frequency $w_2 = w_15 \times r \times \Omega$, when r and $\Omega$ are identical in the case of the two gratings (13,15), as in the example represented. Again, r represents the radial distance of the associated grating point from the axis of rotation and $\Omega$ represents the spatial frequency of the grating.

This produces a modulation of the light intensity of an image point from the superposing of the two frequencies $w_1$ and $w_2$, thereby producing a beat with the frequency $w_3 = w_1 - w_2$. The formation of the beat frequency as a result of combining two optical fields of different frequencies is often referred to as the heterodyne effect.

This means that an image for which the light intensity is modulated at the beat frequency $w_3$ simultaneously at all points is recorded by the detection system 6. With slow modulation, i.e. at $w_3 < 20Hz$, this image can also be observed well with the human eye. The detected image shows an amplitude contrast of the oscillation of the light intensity, i.e., classically bright points show a high amplitude of the oscillation, classically dark points are unmodulated.

With this amplitude contrast according to the invention all of the advantages of simultaneous confocal scanning microscopy can be achieved if the two screens or gratings 13 and 15 are suitably designed. For this purpose, a high spatial frequency or grating constant in the range of half to the full spatial frequency classically transmitted incoherently by the microscope is advantageous.

On close examination, the image recorded by the detection system 6 still includes components which are not modulated at the beat frequency $w_3$, in particular constant light and components with the sum frequency $w_1 + w_2$ and with the frequency $w_2$. These can, however, be filtered out easily. For this purpose, it is advantageous to choose the frequencies $w_1$ and $w_2$ large with respect to their difference $w_3$ and to perform an adaptation to the time constants of the detection system 6 (eyepiece and eye or CCD camera).

In another version of the apparatus for optical image contrast, the screens are ruled groove gratings which are moved essentially perpendicularly to the grating orientation a. This makes the arrangement particularly fast and a good 10% to 20% of the field of view can be observed simultaneously. However, overresolution can only be achieved in the direction perpendicular to the grating orientation. Therefore, with use of a ruled groove grating, it is advantageous to provide optical means for image rotation which can be used to change the direction of the overresolution to a preferred direction of the object. For example, a rotating prism could be inserted into the beam between the beam splitter 12 and the objective 2 for this purpose. This is particularly suitable for structure width determination, for example, of semiconductor components.

If the screens 13 and 15 are made as two-dimensional screens with point-shaped apertures, the full resolution and depth of focus of a confocal scanning microscope is obtained. However, there is a loss in light intensity compared with the use of groove gratings.

Apart from rotating disk gratings 13, 15, the two movable screens and the devices 14, 16 for producing the relative movements can also be formed by other systems.

Figure 2:
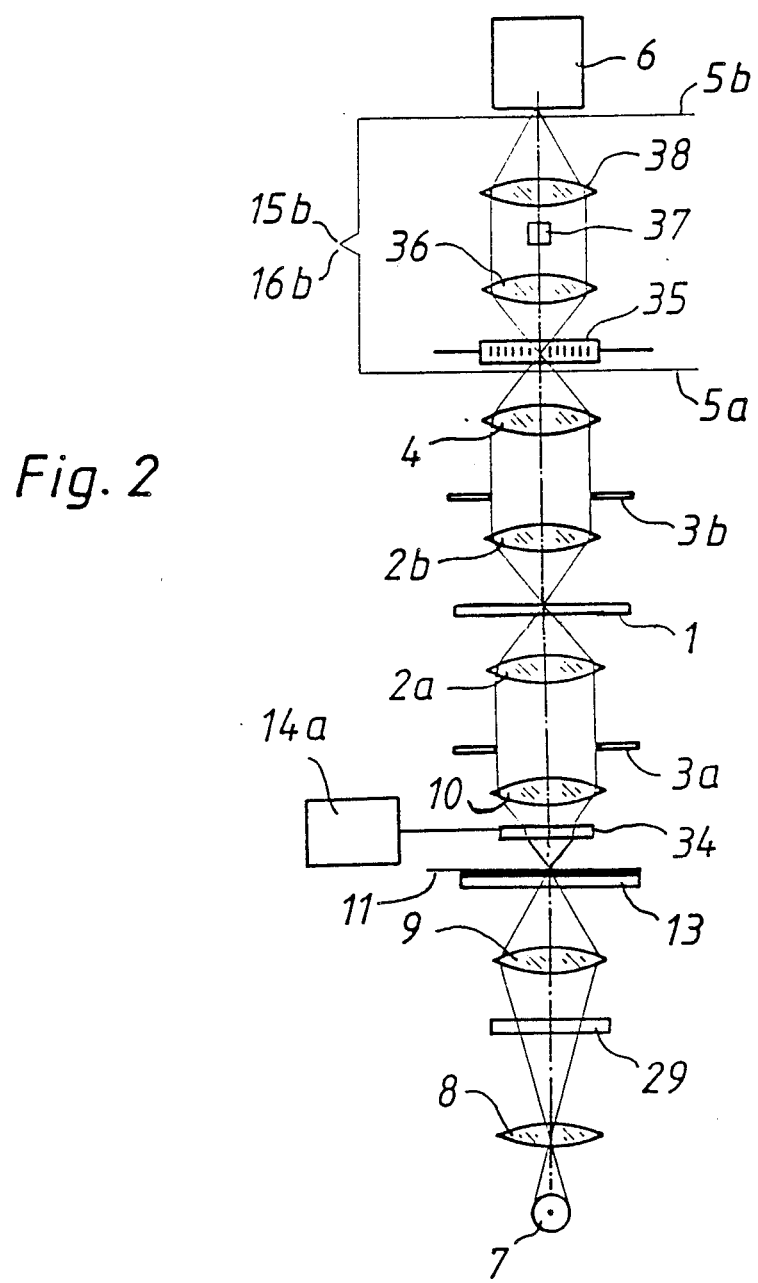
FIG. 2 shows an embodiment of the invention in which the apparatus is structured in a transmitted light configuration wherein two different types of screens and two different types of devices for producing relative movements are utilized.

FIG. 2 shows examples of this in a transmitted light microscope. A condenser 2a with diaphragm 3a in the illumination system is necessary in the case of a transmitted light microscope in addition to the objective 2b with diaphragm 3b. The first screen 13, for example, may be a parallel square bar grating which is fixed in the field diaphragm plane 11 of the illumination device. Imaging is thus in the object plane. A first relative movement between the image of the grating in the object plane and the object 1 is produced by a device, consisting of rotatable plane-parallel glass plate 34 and actuating drive 14b.

The second relative movement may also be advantageously realized by the same means.

In another embodiment of the invention optronic means such as traveling ultrasonic waves produced piezoelectrically in a substrate can be used as screen 15b and at the same time as device 16b for producing the relative movement. In this case, it is possible to dispense with the movement of components, as described in earlier embodiments of the invention, and eliminate associated problems of vibration etc.

In the example illustrated by FIG. 2, the second screen 15b and the second device 16b for the second relative movement are made in the form of an optronic device. For this purpose, the optronic device is a Bragg cell 35 arranged in the image plane 5a. Two lenses 36, 38 and a phase plate 37, arranged between the lenses, complete the device, which produces in the plane 5b the image allowed to pass by the second screen 15b. The image is recorded by the detection system 6 and processed as in the example of FIG. 1. Here too, the same arrangement may be provided as the screen and device for producing relative movement in the illumination beam.

An electronic evaluation of the image recorded by the detection system 6 is advantageous, for which FIG. 1 includes an example of a suitable circuit arrangement.

The frequencies $w_1$ and $w_2$ are sensed from the gratings 13 and 15 by light barriers 17 and 18. An electronic signal is formed by a multiplier 19 and a downstream low-pass filter 20 with a beat frequency $w_3$, which has already been impressed on the image in the detection system 6 by optomechanical means. A threshold detector 21 forms a synchronization signal with the repetition frequency $w_3$ from the electronic signal formed by the multiplier 19 and low-pass filter 20. This synchronization signal then controls the following operations:

1. Erase camera content (CCD camera 6)
2. Switch change-over switch 22 from position M to A
3. Taking of an image during the image integration time and transfer to a first image memory 23 (image A)
4. Switch change-over switch 22 from position A to M
5. Erase camera content
6. Switch change-over switch 22 from position M to B 7. Same as 3, but to a second image memory 24 (image B)

8. Switch change-over switch 22 from position B to M.

Then the sequence can commence again from the beginning. At the same time the synchronization signal of the threshold detector 21 controls the subtraction of images A and B from the image memories 23 and 24 in a subtractor 25, the transfer of the difference image C to a third image memory 26 and the data output, for example, on a visual display unit 27. Due to the fixed phase relationship of the images A and B, the difference image C is no longer modulated at the beat frequency $w_3$ and can be observed in the usual way on the visual display unit 27. The taking time intervals 43,44 for the images A and B are advantageously set by adjustment of the phase of the synchronization signal, formed by threshold detector 21, with respect to the modulation of the image which reaches camera 6, in such a way that image A is taken at maximum intensity and image B is taken at minimum intensity of the modulated image. The difference image C then has maximum contrast.

Figure 3:
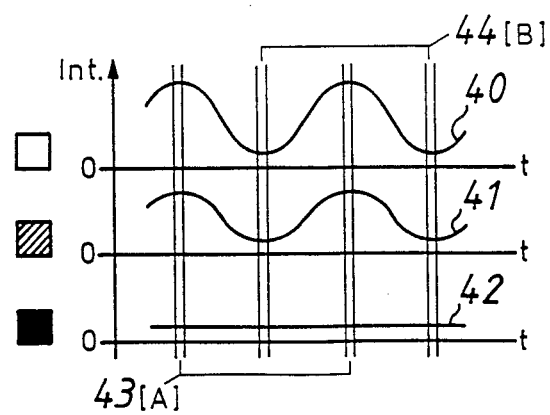
FIG. 3 shows a diagram of the temporal modulation of the light intensity for object points of varying degrees of illumination.

FIG. 3 shows the temporal modulation of the light intensity for a light object point 40, gray object point 41 and black object point 42 at the input of the detection system 6. The curves are modulated at the beat frequency $w_3$. A constant light component, for example, from the ambient illumination of the apparatus according to the invention, is always picked-up by the detection system 6. Thus, the intensity detected is never zero and maintains a certain constant minimum value even in the case of the black point 42. At the intervals 43, at maximum intensity, operation 3 (taking of image A) is then carried out. At the intervals 44, at minimum intensity, operation 7 (taking of FIG. B) is performed.

The difference between the images A and B then produces a great difference in intensity for a light point 40, a moderate difference for a gray point 41 and the difference zero for a black point 42.

The constant light components are suppressed, and the high frequency components in terms of time of the image modulation are averaged out over the intervals 43,44 by the image integration time.

The illustrated arrangement according to the invention also finds advantageous applications in diversely modified optical systems.

Figure 4:
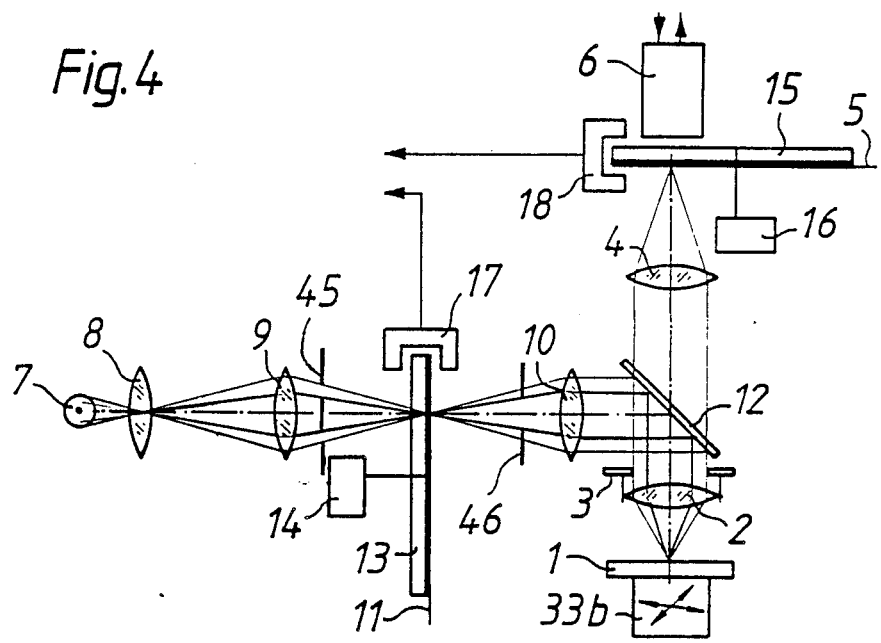
FIG. 4 shows an arrangement according to the invention designed for dark-field illumination of the first screen.

If, according to FIG. 4, a dark field illumination of the first screen 13 is realized in the projection beam by using a central diaphragm 45 and an adapted field diaphragm 46 the constant light component in the image recorded by the detection device 6 is further reduced.

Fluorescence contrast is achieved by using a suitable (short-wave) light source 7 and, if appropriate, a filter 29 in the illumination beam and a blocking filter 30 for the illumination wavelengths. This blocking filter 30 is arranged between the beam splitter 12, which is preferably a dichromatic splitter, and the detection system 6. Even the fluorescence decay time can be determined location-dependently.

For this purpose it is necessary that the device 14 for producing the first relative movement between the image of the first screen 13 and the object 1 is provided with a velocity setting device 28 (FIG. 1). For as soon as the local frequency $w_1$ of the light modulation through the image of the first screen 13 on the object 1 comes close to the value $2\pi/T$ (T=fluorescence decay time), the modulated fluorescence light in the detection system 6 is greatly reduced.

It is advantageous if the second device 16 for producing the second relative movement is also adjustable in velocity, so that the beat frequency $w_3$ can be kept constant.

Without additional optical outlay, an automatic spot or integral focusing can also be realized with the arrangement. For example, a particular image region in a general image can be determined and this image region focused on specifically.

Necessary for this is an additional integration device 31, which integrates the amplitude of the light intensity of an adjustable area region of the images picked up by the detection system 6 over the area. Similarly, a positioning device 33 for the relative position of object 1 and object 2 is required. The combination of a motorized Z drive (33a) for the microscope tube (objective 2 and associated components) and an electronic x-y positioning table 33b for the object 1 is expedient for this. This is represented in FIG. 1.

The integration device 31 takes over from the image memory 26 a certain or adjustable region of the image C formed from the difference of image A and image B, and forms the integral of the light intensity at all image points of the region.

A focusing of an image region onto a point detector can also be realized in the detection system 6. That is, an optical integration arrangement can be used. The focus position for the selected image region is reached when the locally integrated a.c. signal has maximum amplitude in terms of time. This maximum can be found automatically with a control loop 32 for the objective adjustment 33a.

Building on this, area measurements are also possible if the investigated object 1 meets a number of secondary conditions. In the case of a contrastless object 1 with a contour structure within the depth of focus range of classical optical instruments, the area of a depth section achieved with the arrangement according to the invention can be derived from the height of the maximum of the amplitude of the integrated a.c. signal. Thus, a determination of the area ratios of various depth sections can be readily achieved. This is advantageous, for example, in the testing of semiconductor structures. In the case of a transmitted-light arrangement, the areas of the same phase shift are determined.

If the two screens 13,15 are moved at the same velocity, instead of according to the invention at different velocity, that is, for example, if the grating disks 13,15 are rotated at the same angular velocity, in principle the apparatus according to the invention can be converted into a simultaneous confocal scanning microscope equivalent to the prior art according to Xiao et al. and DE-A1 23 60 197. Then, however, in order to really obtain the advantages of that system, the phase position of the two grating disks must be adjusted with very high accuracy and kept constant. This problem obviously does not occur in the case of the apparatus according to the invention in which the two screens rotate with different velocities.

What is claimed is:

1. An apparatus for producing an optical image contrast, comprising:
   a. a first screen;
   b. a projection system for producing an image of said first screen in an object plane, said object plane being adapted for placement of an object therein;

c. a first device for producing a first relative movement between the image of said first screen and said object;
d. a second screen;
e. a system for imaging the object plane into the plane of said second screen, wherein the image of said first screen produced in the plane of said second screen is congruent with said second screen;
f. a second device for producing a second relative movement between the image of said object and said object wherein the image of the object and the image of said first screen in the plane of said second screen have different relative velocities at all times with respect to said second screen; and
g. a detection device for detecting light which passes through said second screen whereby the light has been spatially modulated due to the optical characteristics of said object in the object plane and temporally modulated as a result of the difference in angular velocity between said second screen and the image of said first screen produced at said second screen.

2. An apparatus for producing an optical image contrast as claimed in claim 1, wherein said apparatus comprises a microscope.

3. An apparatus for producing an optical image contrast as claimed in claim 1, wherein said first and second screens comprise line gratings.

4. An apparatus for producing an optical image contrast as claimed in claim 1, wherein said first and second screens comprise two-dimensional screens with point-shaped apertures.

5. An apparatus for producing an optical image contrast as claimed in claim 1, further comprising removable optical means for image rotation inserted between said first screen and said second screen.

6. An apparatus for producing an optical image contrast as claimed in claim 1, wherein said first and second devices for producing relative movement comprise mechanisms which rotate said first and second screens at different angular velocities with respect to each other.

7. An apparatus for producing an optical image contrast as claimed in claim 1, wherein said first screen and said second screen comprise components of a transmitted light system and further comprising means for rotating each of said screens at a different angular velocity to produce said first and second relative movement.

8. An apparatus for producing an optical image contrast as claimed in claim 1, wherein at least one of said first and second devices for producing said first relative movement between said first screen and said object or said second relative movement between the image of the object and said second screen comprises a movable, beam-deflecting optical means, located in at least one of the positions between said first screen and said object and between said second screen and said object.

9. An apparatus for producing an optical image contrast as claimed in claim 1, wherein at least one of said device for producing a first relative movement and said device for producing a second relative movement comprises a drive for moving at least one of said first and second screens.

10. An apparatus for producing an optical image contrast as claimed in claim wherein at least one of said first or second screens and the associated said first or second device for producing relative movement are combined in a controllable optronic element.

11. An apparatus for producing an optical image contrast as claimed in claim 10, wherein said controllable optronic element further comprises a substrate which can be controlled piezoelectrically to produce traveling ultrasonic waves.

12. An apparatus for producing an optical image contrast as claimed in claim 1, wherein said first and said second screens are identical, whereby the image of said first screen produced in the plane of said second screen is congruent with said second screen when the appropriate imaging scale is chosen.

13. An apparatus for producing an optical image contrast as claimed in claim 1, wherein said detection device comprises an optoelectronic image converter system adjacent to said second screen, whereby said detection device produces images at regular intervals from the light which passes the second screen.

14. An apparatus for producing an optical image contrast as claimed in claim 13, further comprising a system for forming the difference between two images coupled to said detection device, whereby said system produces an image of the object without temporal modulation of the light intensity.

15. An apparatus for producing an optical image contrast as claimed in claim 1, further comprising:
a light which produces fluorescence excitation in said object, said light comprising part of said projection system;
a filter for blocking placed between said object and said second screen, wherein said filter blocks the wavelengths of radiation emitted by said projection system; and
a first velocity setting device connected to said first device for producing a first relative movement between the image of said first screen and said object.

16. An apparatus for producing an optical image contrast as claimed in claim 15, further comprising a second velocity setting device connected to said second device for producing a relative movement.

17. An apparatus for producing an optical image contrast as claimed in claim 13, further comprising:
a positioning device for moving the position of said object with respect to said projection system and with respect to said system for imaging said object plane into the plane of said second screen;
an integration device connected to said optoelectronic image converter which integrates the amplitude of the light intensity of the images produced over an adjustable area, wherein said adjustable area is defined by moving the object with said positioning device.

18. An apparatus for producing an optical image contrast as claimed in claim 1, wherein said projection system further comprises at least one diaphragm for producing dark-field illumination of said first screen.

19. An apparatus for producing an optical image contrast, comprising:
a. a first screen;
b. means for producing an image of said first screen in an object plane, said object plane being adapted for placement of an object therein;
c. means for producing a first relative movement between the image of said first screen and said object;
d. a second screen;
e. means for imaging the object plane into the plane of said second screen, wherein the image of said first screen produced in the plane of said second screen is congruent with said second screen;

f. means for producing a second relative movement between the image of said object and said object, wherein the image of the object and the image of said first screen in the plane of said second screen have different relative velocities at all times with respect to said second screen;

g. means for detecting light which passes through said second grating, whereby the light has been spatially modulated due to the optical characteristics of said object in the object plane and temporally modulated as a result of the difference in angular velocity between said second screen and the image of said first screen produced at said second screen.

20. An apparatus for producing an optical image contrast as claimed in claim 14, wherein said means for producing a first relative movement and said means for producing a second relative movement comprise mechanisms which rotate said first and second screens at different angular velocities with respective to each other.

* * * * *